Jan. 22, 1929. 1,699,556
R. B. WOLF
ACID SULPHITE PULP PROCESS
Filed June 19, 1925
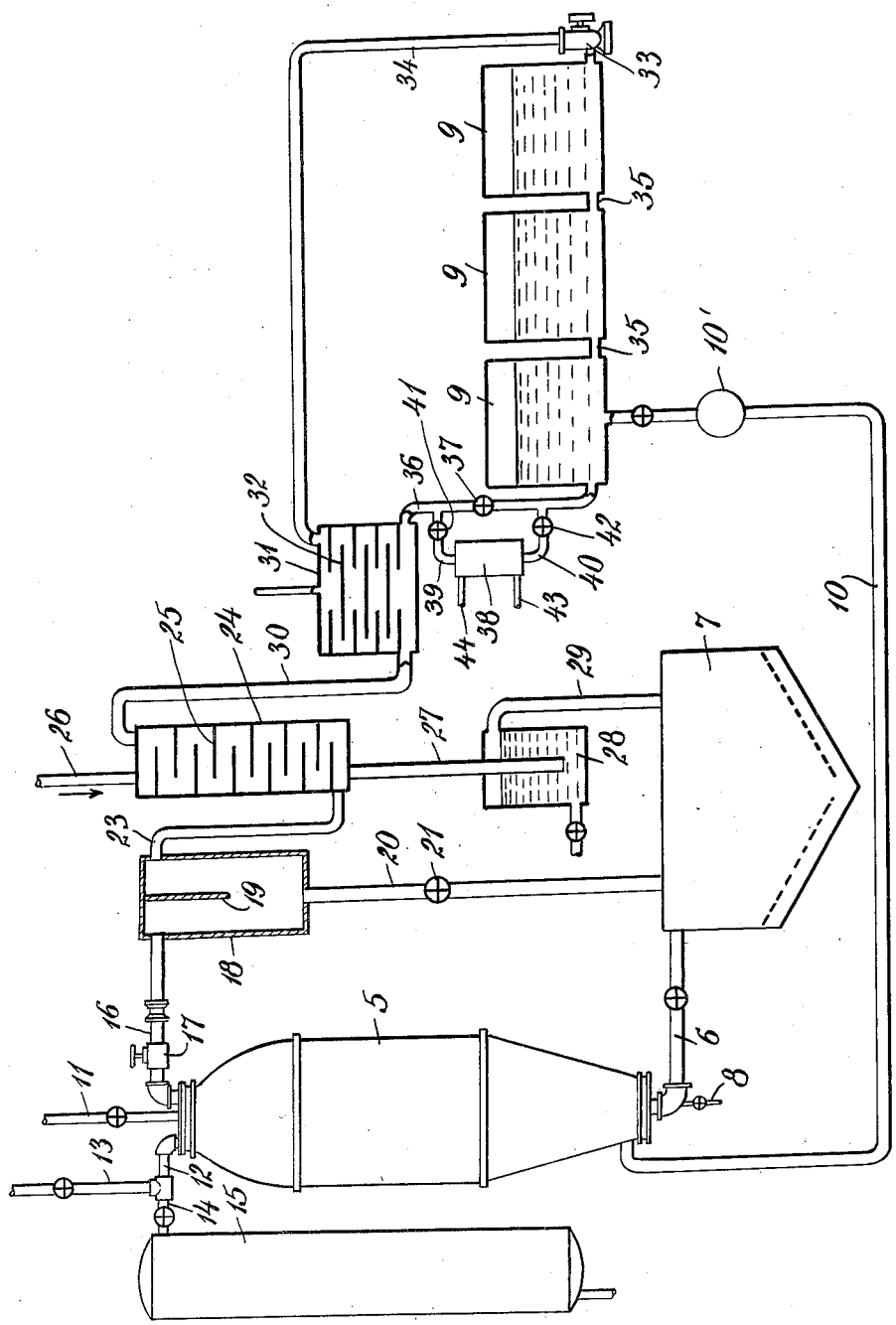
INVENTOR
Robert B. Wolf.
BY
Pennie Davis Marvin & Edmonds
his ATTORNEYS

Patented Jan. 22, 1929.

1,699,556

UNITED STATES PATENT OFFICE.

ROBERT B. WOLF, OF NEW YORK, N. Y.

ACID-SULPHITE-PULP PROCESS.

Application filed June 19, 1925. Serial No. 38,136.

This invention relates to the acid sulphite process employed in the manufacture of paper pulp, and particularly to an improvement therein whereby it is possible to use a more concentrated acid sulphite solution and to shorten the time required for the digestion of the pulp without sacrificing its quality.

The acid sulphite process has been in use for many years and depends upon the cooking of the pulp with an acid solution of calcium bisulphite and free sulphur dioxide. In this process as ordinarily applied the total sulphur dioxide content of the solution is limited to approximately 4 to 4½%, of which usually 3 to 4% is free sulphur dioxide. The time required for the cooking is from twenty to thirty hours if the highest grade of fibre is produced by the indirect or Mitscherlick process. The time can be shortened to from eight to twelve hours by using a higher temperature during the cooking as is customary in what is known as the direct or quick cook process. The cooking at high temperatures is, however, undesirable because it tends to cause disintegration of the fibre and introduces serious losses in the operation.

It has been discovered that the cooking time can also be shortened by the use of more concentrated sulphite solutions; that is to say, solutions containing 7% or more of sulphur dioxide. This, however, introduces a further difficulty in recovering the sulphur dioxide at the end of the cooking operation and unless it is recovered and reused there is a considerable loss. Furthermore, the discharge of sulphur dioxide into the atmosphere is prohibited in many states, and in any event invites litigation owing to the resulting damage to surrounding vegetation. The recovery of sulphur dioxide in cooking operations, involving highly concentrated sulphite liquor, has been employed heretofore, but it requires the installation of a large condenser and an acid system, either milk of lime or tower, in which the sulphur dioxide is absorbed. This practice is economically applicable only in the largest installations owing to the large investment in apparatus.

It is the object of the present invention to provide an improvement in the acid sulphite process whereby the sulphur dioxide from the digester can be absorbed in relatively strong sulphite solution and returned to the digester for the subsequent cooking operation. The process provides for the cyclical use of the sulphur dioxide without recourse to the ordinary acid system. It avoids losses of sulphur dioxide and permits the cooking of the pulp with strong sulphite liquor containing approximately 7.0 total sulphur dioxide. The cooking can be carried on at low temperatures with such a liquor and completed in from eight to twelve hours, the resulting fibre being practically as strong as that ordinarily produced by the indirect process of cooking.

Further objects and advantages of the invention will be apparent as it is better understood by reference to the following specification and the accompanying drawing which illustrates diagrammatically a cooking system equipped to permit the blowing down of the digester pressure at the end of the cooking operation and the recovery of the sulphur dioxide and the return thereof to the cooking liquor.

In the sulphite process the pulp is cooked in a suitable digester with the acid sulphite liquor prepared in any suitable way, for example, by the burning of sulphur to produce sulphur dioxide and the absorption thereof in a lime solution. At the end of the cooking operation and before the pulp is removed from the digester by blowing into the blow pit, the digester is relieved down to practically atmospheric pressure by permitting the sulphur dioxide to escape from the top thereof. Usually the relief pipe is screened to prevent the passage of fibre. This is impracticable for the final blowing down because it increases materially the time required to reduce the pressure in the digester and remove the pulp. The necessity for screens may be avoided in the present invention by the provision of a pulp separator, but this is not essential as the pulp can be separated with the water in a condenser and delivered to the blow-pit. If a separator is employed it is also connected to the blow-pit so that all of the fibre is recovered eventually and only the gas escapes.

The condenser is provided to relieve the gas of the water vapor which is carried with it from the digester and incidentally to separate fibre as indicated. In the condenser the gas is subjected to the action of a large volume of cooling water which is maintained at a suitable temperature so that it leaves the condenser at about 200° F. As the gas passes through the condenser the water vapor which is carried from the digester with the gas is condensed and joins the cooling water which is delivered through a suitable trap to the blow-pit. The gas is permitted to escape from the condenser substantially free from water vapor.

This gas, which consists mainly of sulphur dioxide to be recovered, is delivered to an absorber in which it contacts with a large volume of acid sulphite solution which is pumped through the absorber from the acid storage tanks. These tanks may hold, for example, approximately a day's supply or perhaps 300,000 gallons of acid sulphite solution prepared in the usual way and containing approximately 7% or more sulphur dioxide. The time for blowing down the digester is ordinarily about twenty minutes, and during this time the entire volume of sulphite liquor in the tanks may, if desired, be pumped through the absorber. It is practical without the use of excessive power to pass approximately 15,000 gallons of the sulphite solution through the absorber every minute of the blowing down period of a ten ton digester and the large volume of solution will absorb readily within the time noted, all of the sulphur dioxide coming from the digester. As the average percentage of total sulphur dioxide in the digester at the beginning of the blow down period will be approximately 1½%, the absorption of sulphur dioxide will raise the acid content of the solution approximately 2% or from 7.0 to 7.14%, thus producing the strong sulphite liquor which is used in the process. The circulation of the large volume of solution avoids saturation of the acid in the storage tanks and the consequent possible loss of the sulphur dioxide. The relatively small amount, if any, of sulphur dioxide which is not absorbed in the sulphite solution can be delivered through a suitable vent to the acid system and utilized there in producing fresh sulphite solution for use in the process. The amount of acid to be recovered in this way will always be relatively small because of the effectiveness of the absorber which is due to the large volume of solution which passes therethrough.

Under certain conditions when the atmosphere is relatively warm, it will be desirable to cool the saturated sulphite solution. This can be accomplished readily by the use of surface coolers and the provision of by-pass valves so that the solution can be passed through the coolers in heat exchange relation with the cooling water.

Referring to the drawing, 5 indicates a digester which may be of the usual type employed in the acid sulphite process. It is connected at the bottom by a valved pipe 6 to a blow-pit 7 and is provided with the usual valved pipe 8 for introducing steam to control the cooking operation. Provision is made also for the introduction of the sulphite liquor which may be pumped from the acid storage tanks 9 through a pump 10' and pipe 10. A screened and valved pipe 11 is connected to the top of the digester to permit the usual relief during cooking. To facilitate blowing down a pipe 12 leading to the top of the digester is connected to a valved branch 13 leading to a high pressure steam main and to a valved branch 14 which may be supplied with compressed air from a tank 15.

A relief pipe 16 with a valve 17 is connected to the top of the digester and to a pulp separator 18, if such a separator is employed. The separator may consist of a chamber with one or more baffles 19 and is connected by a pipe 20 controlled by a valve 21 to the blow-pit. The separator removes the liquor and the fibre which is carried over from the digester. These are conducted through the pipe 20 to the blow-pit and mingled with the pulp which is blown from the digester.

The sulphur dioxide escaping from the separator is delivered through a pipe 23 to a condenser 24. This may consist of a chamber containing a large number of baffles 25 over which water introduced through a pipe 26 is permitted to flow. The sulphur dioxide enters the bottom of the condenser and passes upwardly through the baffles in contact with the downwardly flowing water. The latter is maintained at the temperature necessary, to ensure condensation and consequent separation of the greater portion of the moisture from the gas. The cooling water with the condensed moisture passes through a pipe 27 to a water seal 28. The water seal has an overflow pipe 29 leading to the blow-pit. Any fibre which escapes the separator is washed from the gas by the relatively large volume of cooling water and is carried with it to the blow-pit. Consequently no fibre can escape from the system which in this respect is unusually efficient. The condenser is, in fact, so effective in separating fibre from the gas that the separator can be omitted, the gas being relieved in that case directly to the condenser.

The sulphur dioxide which leaves the condenser substantially free from moisture and fibre is delivered by a pipe 30 to the acid absorber 31. This also comprises a chamber with baffles or other suitable surface 32 therein, the chamber being of suitable size to accommodate the passage of the necessary volume of solution therethrough within the time required to relieve the digester. The solution which is withdrawn from one of the acid storage tanks by a large pump 33 is delivered through a pipe 34 to the top of the absorber 31. The pump may be driven from any suitable source of power and will require for an installation of the size indicated (a 100 ton mill) approximately 75 H. P. in order that the required amount of solution may be passed through the absorber in the time indicated. If a plurality of storage tanks is employed they are connected preferably as indicated in the drawing by pipes 35 and the acid is withdrawn from the most remote tank. As the solution passes through the absorber it readily takes up the sulphur dioxide and is delivered through a pipe 36 to the nearest tank 9. The solution flows from tank to tank and the arrangement ensures the delivery of the weaker solution to the absorber, and consequently the maximum effectiveness in the recovery.

To permit cooling the solution when necessary a valve 37 may be disposed in the pipe 36 and a cooler 38 may be connected thereto by pipes 39 and 40 with suitable by-pass valves 41 and 42. When the valve 37 is closed and the valves 41 and 42 are open, the solution will pass through the cooler 38. This may be supplied with cooling water through a pipe 43, the water escaping through a pipe 44. By controlling the volume of water which is passed through the cooler, the temperature of the acid sulphite solution may be reduced sufficiently to avoid the release of sulphur dioxide when the temperature of the surrounding atmosphere is relatively high.

The absorption of the sulphur dioxide is completed when the digester has been reduced to atmospheric pressure and the acid sulphite solution in the storage tank has been increased approximately 2% in its sulphur dioxide content. This solution is ready for further use in filling the digesters for as soon as a digester has been blown and recharged the solution can be introduced in the usual way.

As will be readily understood the recovery of sulphur dioxide released from the digester has been simplified materially and it is made available for immediate reuse instead of passing through the complicated acid system of the usual recovery plant. Furthermore, the sulphur dioxide is utilized to fortify the acid sulphite solution to a point which makes it more effective in the digester so that the cooking time can be shortened materially without causing disintegration of the pulp. None of the sulphur dioxide is lost or discharged to the atmosphere and provision is made also for the recovery of all of the fibre. These savings are added to those effected by the increased efficiency of the operation when conducted with the concentrated sulphite solution, and consequently the improved process is capable of application with commercial advantage wherever the acid sulphite process is used.

The invention as described herein comprehends the recovery of sulphur dioxide released from the digester or other part of the system in a relatively large volume of strong sulphite solution circulating in contact with the gas. It is apparent, therefore, that various changes may be made in the operation and the details of the apparatus employed in the practice thereof without departing from the invention or sacrificing any of the advantages thereof.

I claim:

1. In an apparatus for preparing paper pulp the combination of a digester, acid liquor storage tanks, an absorber, means for circulating the contents of the storage tanks through the absorber, means for delivering gas from the digester to the absorber and means between the digester and absorber to separate moisture and fibre from the gas.

2. In an apparatus for preparing paper pulp the combination of a digester, acid liquor storage tanks, an absorber, means for circulating the contents of the storage tanks through the absorber, means for delivering gas from the digester to the absorber and means for cooling the liquor before it returns to the storage tanks.

3. In an apparatus for preparing paper pulp the combination of a digester, acid liquor storage tanks, an absorber, means for circulating the contents of the storage tanks through the absorber, means for delivering gas from the digester to the absorber, means for separating moisture and fibre from the gas before it enters the absorber and means for recovering the fibre.

4. The improvement in the acid sulphite process of preparing paper pulp, which comprises relieving the digester at the end of the cook through an unobstructed relief opening, subjecting the gases discharged from the digester to cooling with water to condense the steam and to separate fibre from the gases and conveying the gases in surface contact with successive portions of a large volume of strong sulphite liquor circulated from a storage supply of the liquor at a rate which causes the major portion of the liquor to contact with the gases during the blow-down period.

5. The improvement in the acid sulphite process of preparing paper pulp, which comprises relieving the digester at the end of the cook through an unobstructed relief opening, subjecting the gases discharged from the digester to cooling with water to condense the steam and to separate fibre from the gases, conveying the gases in surface contact with successive portions of a large volume of strong sulphite liquor circulated from a storage supply of the liquor at a rate which causes the major portion of the liquor to contact with the gases during the blow-down period, and cooling the circulating liquor after contact with the gases to maintain a temperature at which the absorbed gases may be retained in the liquor under atmosphere pressure.

In testimony whereof I affix my signature.

ROBERT B. WOLF.